No. 722,039. PATENTED MAR. 3, 1903.
G. C. PLUMMER.
CONVEYER BELT.
APPLICATION FILED NOV. 24, 1902.
NO MODEL.

Witnesses.
Robt Everitt,
V. Coombs

Inventor.
George C. Plummer.
By Wm M. Stockbridge
Att'y.

UNITED STATES PATENT OFFICE.

GEORGE C. PLUMMER, OF PHILADELPHIA, PENNSYLVANIA, ASSIGNOR TO MAIN BELTING COMPANY, OF PHILADELPHIA, PENNSYLVANIA, A CORPORATION OF PENNSYLVANIA.

CONVEYER-BELT.

SPECIFICATION forming part of Letters Patent No. 722,039, dated March 3, 1903.

Application filed November 24, 1902. Serial No. 132,676. (No model.)

*To all whom it may concern:*

Be it known that I, GEORGE C. PLUMMER, a citizen of the United States, residing at Philadelphia, in the county of Philadelphia and State of Pennsylvania, have invented certain new and useful Improvements in Conveyer-Belts, of which the following is a specification.

My invention relates to conveyer-belts, the object of the same being to provide a belt of this kind which is constructed of stitched canvas, has a firm wear-resisting central body, and has flexible wings projecting from the sides thereof.

The invention consists of a conveyer-belt having a body made up of a series of layers or plies of canvas stitched together and formed with grooves in the side edges thereof and wings of flexible canvas of fewer plies than said body, the said wings fitting within said grooves and secured to said body.

The invention also consists of a conveyer-belt having a body made up of a plurality of layers or plies of canvas stitched together and saturated with a drying and stiffening composition and wings of fewer plies of canvas than said body, the said wings being saturated with a non-drying composition fitting within said grooves and secured to said body.

The invention also consists in certain features and details of construction, which will be hereinafter more fully described and claimed.

Figure 1:
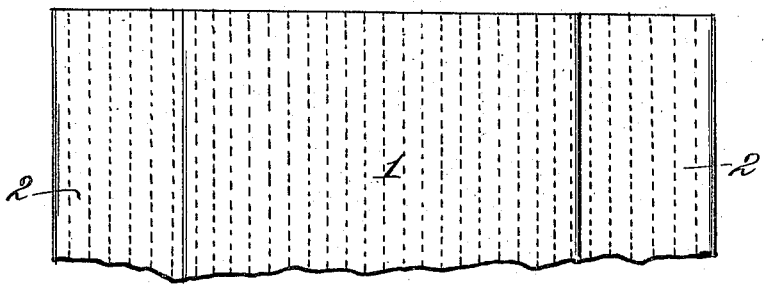
Figure 2:
Figure 3:
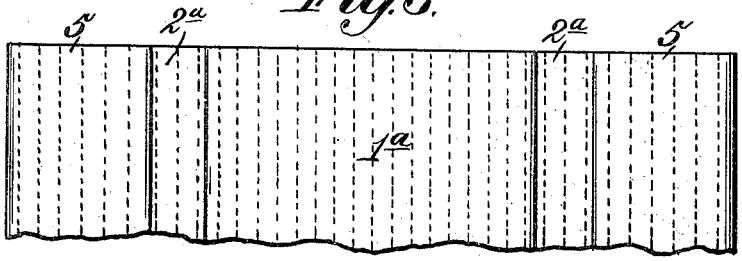
Figure 4:
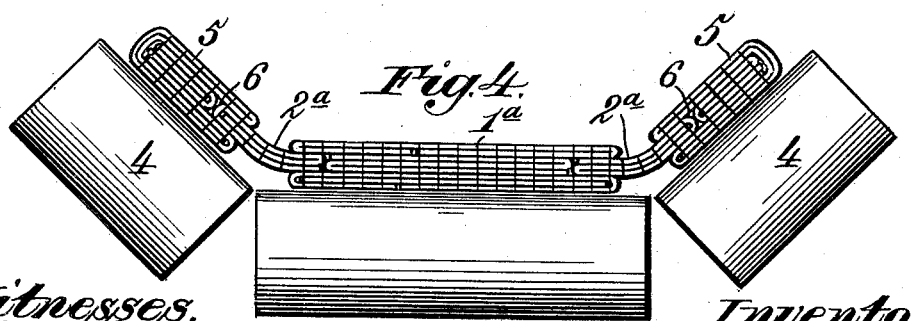

In the drawings forming part of this specification, Figure 1 is a plan or face view of a portion of a conveyer-belt constructed in accordance with my invention. Fig. 2 is a sectional view of the same shown in connection with the guide-rollers around which the belt passes. Fig. 3 is a plan or face view of an alternative form of belt, and Fig. 4 is a cross-section of the same.

Like reference-numerals indicate like parts in the different views.

My improved conveyer-belt is made up of a central body 1 and the wings 2, secured to the sides thereof. Both these parts are preferably constructed of canvas, although other suitable fabric may be employed. The body 1 is made of a series of plies or layers of canvas folded or laid one upon the other and stitched together as in the ordinary construction of canvas belt—that is to say, the rows of stitching extend longitudinally of the belt and are arranged rather closely together, so as to impart firmness and stability to said body. The stitches are extended through all the different plies or layers; but the central plies or layers, or rather those which are located intermediate the upper and lower faces of the body 1, terminate short of the side edges of said body, forming the grooves 3 in said side edges. The wings 2 are introduced into the grooves 3 and are stitched, riveted, or otherwise fastened to the body 1. The wings 2 are each made thinner than the body 1—that is to say, they are made of fewer plies of canvas. These plies, however, are stitched together in the usual manner, the rows of stitching extending longitudinally thereof. As a result of this construction the central body portion of the belt is rendered firm and capable of resisting wear, whereas the wings 2 are flexible and are consequently capable of being automatically bent up or inclined by the guide-rollers 4, over which the belt is passed when in use.

To render the body 1 of the belt more firm and capable of resisting greater wear from the bulk of weight carried thereon, I propose to saturate the same with a composition of oils, gums, &c., which has a tendency to dry, and which when dry, or nearly so, causes the part saturated therewith to become more firm and less flexible. The wings 2 are also saturated with a different composition of oils, gums, &c., the latter having a less tendency to dry than that with which the body is saturated. The result of this is that as the body composition dries the body of the belt becomes more and more firm and unyielding and has greater wear-resisting qualities, while the wings 2, as compared with the body, remain flexible as time goes on. For convenience of description I term the substance with which the body 1 is saturated a "drying" composition and that with which the wings are saturated a "non-drying" composition. The former ultimately gets hard or approaches hardness, a part of the ingredients solidifying, while others evaporate. The non-drying composition does not harden or comparatively stiffen. The body 1 and the wings 2 may be saturated with the respective drying and non-drying compositions prior to the attachment of these parts to each other, or the wings may be saturated with the non-drying composition, afterward fastened to the body, and the belt as a whole subsequently treated with the drying composition. As the wings 2 are already saturated, they will not take up any appreciable quantity of the drying composition, and the complete belt will be practically the same as if the different parts thereof had been treated with their respective compositions separately.

As an example of a drying composition that may be used I may mention a mixture of linseed-oil with some substance that will impart oxygen thereto, such as turpentine. Any other mixture, however, or, in fact, any single oil or other like substance having the requisite drying and stiffening qualities may be employed. As satisfactory non-drying compositions may be mentioned olive-oil, castor-oil, and linseed-oil, either with or without other ingredients to increase or decrease its drying qualities. A suitable gum, such as common resin, may be used as one ingredient of both the drying and non-drying compositions.

In the form of my invention shown in Figs. 3 and 4 of the drawings the body $1^a$ and the wings $2^a$ are constructed and connected together in the same manner as the corresponding parts in Figs. 1 and 2. In addition to the body $1^a$ and the wings $2^a$, however, I may employ the supplemental side pieces 5. These side pieces are made of the same material and in substantially the same manner as the body of the belt—that is to say, they are each made up of a series of layers or plies of canvas stitched together with the stitches extending through all the plies thereof and running longitudinally of the belt. Said side pieces are further formed with grooves 6 in their inner side edges, into which grooves the outer side edges of the wings $2^a$ fit. The said wings $2^a$ are stitched, riveted, or otherwise secured to the side pieces 5 in the same manner that said wings are secured to the body. The side pieces 5 are preferably treated with a drying composition of oils and gums similar to that with which the body of the belt is treated.

From the foregoing description it will observed that in both forms of my improved belt a central firm wear-resisting body is provided, which is capable of carrying the bulk of the weight when the belt acts as a conveyer, and that flexible wings are connected to the side edges of said body, which may be readily turned up by the guide-rollers 4, so as to present themselves as guards along the sides of the belt. These wings are inserted into grooves in the side edges of the body and are themselves protected from wear along their lines of junction with the body by a portion of the body itself. Each form of the belt shown is capable of reversal, so that either side may be uppermost to receive the wear of the load. Furthermore, there are no projecting portions of the flexible wings to receive the wear of the load.

The embodiment of my invention illustrated in the drawings and above described is that which is deemed by me at the present time to be the preferable one. I realize, however, that the same is susceptible of modification, and I do not, therefore, limit myself to any of the details of construction, except as defined in the appended claims. For example, it is not of the essence of my invention that the body and wings or the body, wings, and supplemental side pieces of the belt be made separately and afterward assembled in the manner described. These parts may be integral with each other and constructed simultaneously—that is to say, they may be built up as a part of the belt at the time it is folded together.

Having now described my invention, what I claim as new, and desire to secure by Letters Patent, is—

1. A conveyer-belt having a central body, and flexible wings projecting from the side edges of said body and connected thereto along lines between the two faces of said body.

2. A conveyer-belt having a central body, and flexible wings projecting from the side edges of said body, the said wings being thinner than said body and connected thereto along lines between the two faces thereof.

3. A conveyer-belt having a firm wear-resisting body of stitched canvas, and flexible wings of stitched canvas thinner than said body, projecting from the side edges thereof.

4. A conveyer-belt having a central body, provided with grooves in the side edges thereof, and flexible wings seated in said grooves and secured to said body.

5. A conveyer-belt having a central body made up of a series of layers or plies of canvas secured to each other by longitudinal rows of stitching, the central plies being narrower than the others, forming grooves in the side edges of said body, and wings made up of fewer plies of canvas than said body, the said wings fitting within said grooves and being secured to said body.

6. A conveyer-belt having a central body of canvas, saturated with a stiffening, drying composition, and wings of canvas secured to the side edges of said body, saturated with a non-drying composition.

7. A conveyer-belt having a body of canvas, saturated with a stiffening, drying composition, and having grooves along its side edges, and wings of canvas, thinner than said body and saturated with a non-drying composition, the said wings being seated in said grooves and secured to said body.

8. A conveyer-belt having a central body, flexible wings projecting from the side edges of said body, and supplemental side pieces projecting from the side edges of said wings.

9. A conveyer-belt having a central body, flexible wings projecting from the side edges of said body, and supplemental side pieces projecting from the side edges of said wings, the said wings being connected to said body and to said supplemental side pieces along lines between the two faces of said parts.

10. A conveyer-belt having a central body, flexible wings projecting from the side edges of said body, and supplemental side pieces projecting from the side edges of said wings, the said wings being thinner than said body and side pieces, and connected thereto along lines between the two faces thereof.

11. A conveyer-belt having a firm, wear-resisting body of stitched canvas, flexible wings of stitched canvas thinner than said body, projecting from the side edges thereof and supplemental side pieces of stitched canvas, projecting from the side edges of said wings.

12. A conveyer-belt having a central body, provided with grooves in the side edges thereof, flexible wings seated in said grooves and secured to said body, and supplemental side pieces having grooves in their inner side edges in which said wings fit and are secured.

13. A conveyer-belt having a central body made up of a series of layers or plies of canvas secured to each other by longitudinal rows of stitching, the central plies being narrower than the others, forming grooves in the side edges of said body, wings made up of fewer plies of canvas than said body, the said wings fitting within said grooves and being secured to said body, and supplemental side pieces made up of a series of layers or plies of canvas secured to each other by longitudinal rows of stitching, the central plies being narrower than the others, forming grooves along the inner side edges of said side pieces in which said wings fit and are secured.

14. A conveyer-belt having a central body of canvas, saturated with a stiffening, drying composition, wings of canvas secured to the side edges of said body, saturated with a non-drying composition, and supplemental side pieces of canvas, saturated with a stiffening, drying composition, the said side pieces being secured to the outer edges of said wings.

15. A conveyer-belt having a body of canvas, saturated with a stiffening, drying composition, and having grooves along its side edges, wings of canvas, thinner than said body and saturated with a non-drying composition, the said wings being seated in said grooves and secured to said body, and supplemental side pieces of canvas, saturated with a stiffening, drying composition of substantially the same construction as said body, and having grooves along their inner edges in which said wings fit and are secured.

In testimony whereof I have hereunto set my hand in presence of two subscribing witnesses.

GEORGE C. PLUMMER.

Witnesses:
J. B. JARDELLA,
H. J. ROTH.